US006805312B2

(12) United States Patent
Capp

(10) Patent No.: US 6,805,312 B2
(45) Date of Patent: Oct. 19, 2004

(54) FOOD PREPARATION APPLIANCE

(76) Inventor: Rand Capp, 3900 Placita Del Rico, Las Vegas, NV (US) 89120

(*) Notice: Subject to any disclaimer, the term of this patent is extended or adjusted under 35 U.S.C. 154(b) by 234 days.

(21) Appl. No.: 09/902,222

(22) Filed: Jul. 9, 2001

(65) Prior Publication Data
US 2002/0027175 A1 Mar. 7, 2002

Related U.S. Application Data
(60) Provisional application No. 60/218,403, filed on Jul. 14, 2000.

(51) Int. Cl.[7] .............................................. B02C 11/08
(52) U.S. Cl. .................. 241/36; 241/65; 241/199.12; 241/260.1; 366/145
(58) Field of Search ................................ 366/144–149; 241/65, 282.1, 282.2, 199.12, 36, 260.1

(56) References Cited

U.S. PATENT DOCUMENTS

| 3,502,848 | A |   | 3/1970  | Fink          |         |
|-----------|---|---|---------|---------------|---------|
| 3,681,568 | A |   | 8/1972  | Schaefer      |         |
| 4,307,287 | A |   | 12/1981 | Weiss         |         |
| 4,417,506 | A |   | 11/1983 | Herbst et al. |         |
| 4,747,696 | A |   | 5/1988  | McCrory et al.|         |
| 4,952,069 | A |   | 8/1990  | Boulard       |         |
| 5,019,680 | A |   | 5/1991  | Morino et al. |         |
| 5,228,381 | A |   | 7/1993  | Virgilio et al.|        |
| 5,280,152 | A |   | 1/1994  | Lee           |         |
| 5,520,094 | A |   | 5/1996  | Lu            |         |
| 5,636,923 | A | * | 6/1997  | Nejat-Bina    | 366/205 |
| 5,711,602 | A |   | 1/1998  | Rohring et al.|         |
| 5,829,341 | A |   | 11/1998 | Lin           |         |
| 6,550,372 | B1| * | 4/2003  | Sharples      | 99/331  |

FOREIGN PATENT DOCUMENTS

| EP | 0556467    | * | 8/1993 |
| GB | 2196238 A  | * | 4/1988 |

* cited by examiner

Primary Examiner—Mark Rosenbaum
(74) Attorney, Agent, or Firm—Weide & Miller, Ltd.

(57) ABSTRACT

A food preparation appliance includes a food preparation container and a base unit. The base unit includes a stirring mechanism drive and a heating element. The heating element comprises an induction heating element. The base unit has a control panel for use in controlling the stirring mechanism drive and the heating element. In one or more embodiments, the base unit includes a processor and memory storage device controlling the stirring and heating mechanisms in a specific sequence and manner of operation. The food preparation container comprises a specially configured pot having a mixer which is removably located in its interior and configured to be rotated with the stirring mechanism drive. The mixer includes a helical central blade and an outwardly extending wiping blade. The pot may be removed from the base unit and used independently thereof.

12 Claims, 6 Drawing Sheets

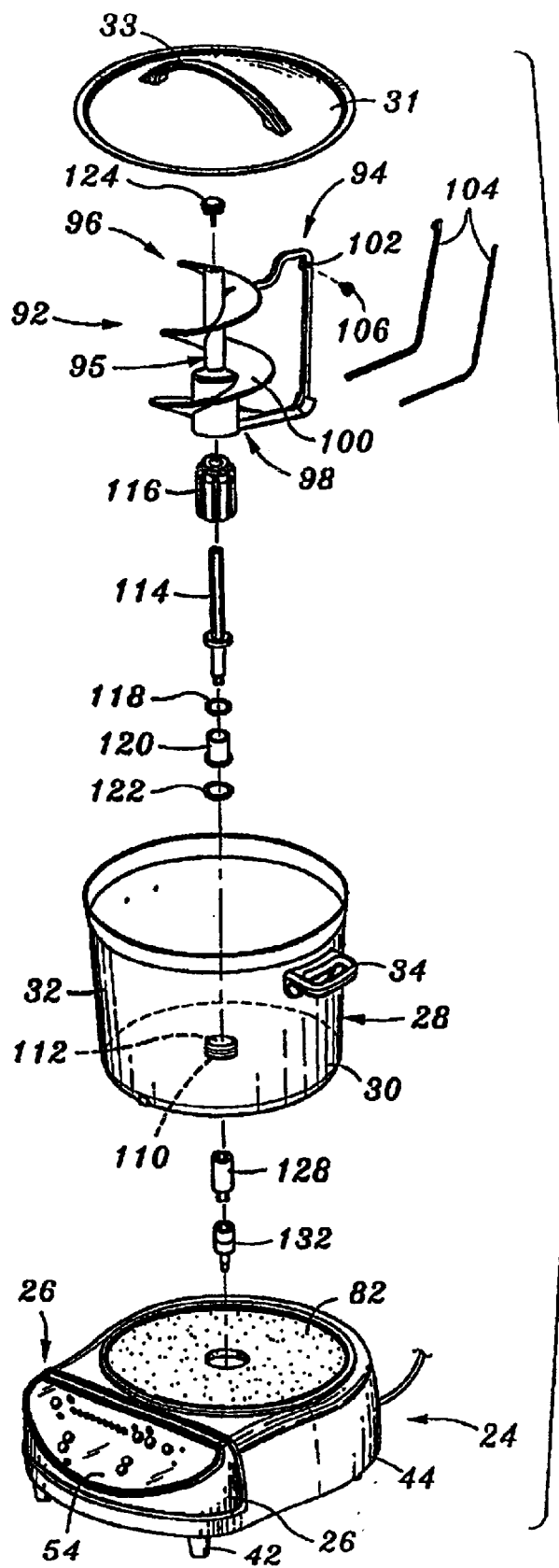
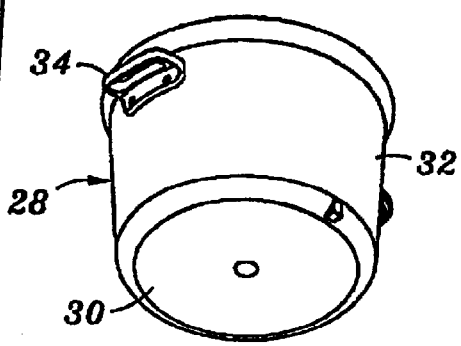

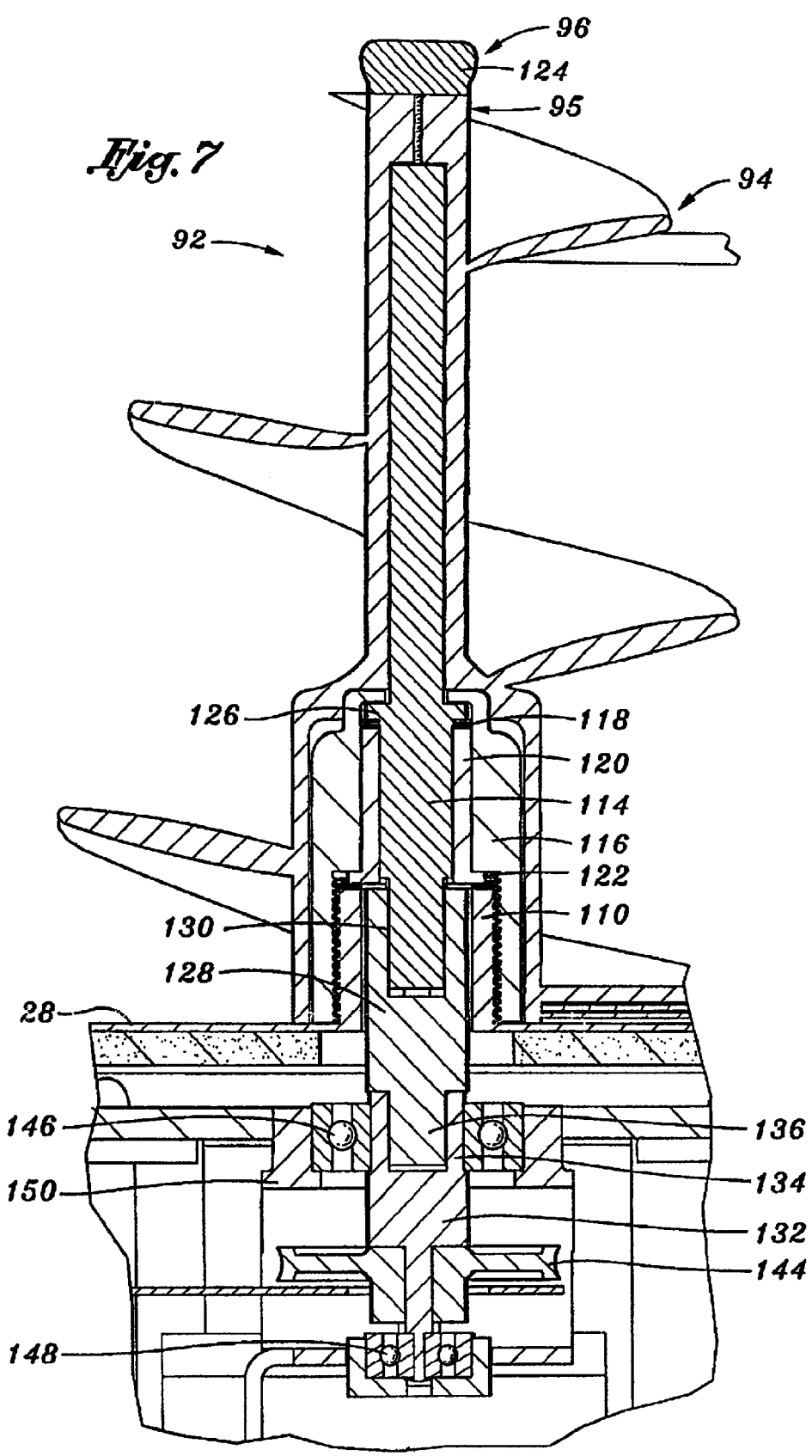

FOOD PREPARATION APPLIANCE

This application claims the benefit of Provisional Application No. 60/218,403, filed Jul. 14, 2000.

FIELD OF THE INVENTION

The present invention relates to food preparation devices, and more particular, such devices known as home cooking appliances.

BACKGROUND OF THE INVENTION

The number of tasks that people must complete each day is increasing as time passes by. As a result, it is necessary for people to either eliminate non-essential tasks in order to free up time for necessary tasks, or to reduce the amount of time that is spent on one or more tasks. Non-essential tasks which are eliminated often include recreational activities. Some tasks, however, can not be eliminated. For example, while workers are required to work increasingly longer days, each worker must provide themselves with the basic living essentials. Among other things, such needs include food.

Over time, a wide variety of appliances have been developed for reducing the time necessary to prepare food for consumption. Such devices are numerous, and include toasters, microwaves, blenders and the like. In general, however, these devices are adapted to perform only a single simple function, such as heating, toasting or the like. The act of food preparation still generally requires one to engage in a number of acts. For example, to prepare many foods, a person must utilize a stove to heat the food ingredients while manually mixing or stirring the ingredients, and manually controlling the heat applied to the ingredients via burner controls of the stove. In addition, the "single-function" appliance often consumes too much kitchen space in relation to its level of usage. For example, a bread machine may only be used once a week to bake a loaf of bread, but consumes a great deal of space.

Another problem with many appliances which have been developed is that they are too complex to operate or are not user friendly. For example, an appliance which is difficult to set up and/or clean is not likely to be used.

Many current appliances also waste energy. For example, much of the energy used to heat a burner of a stove heats the surrounding air and not the food which is being prepared. The user pays for this wasted energy.

It is desired to provide an appliance which is capable of performing multiple of these food preparation tasks. In addition, it is desirable for the appliance to be user-friendly in both set-up and clean-up. It is an additional desire to provide an appliance which is energy efficient. Furthermore, it is desirable to provide an appliance meeting the above-stated desires that is also compact and space-efficient.

SUMMARY OF THE INVENTION

The present invention comprises an improved food preparation appliance, including the configuration and assembly thereof, as well as a method of preparing food.

In one embodiment, the appliance includes a food preparation container and a base unit. The base unit includes a stirring mechanism drive and a heating element. The heating element comprises an induction heating element. The stirring mechanism drive includes a motor which drives a drive pin.

The base unit has a control panel for use in controlling the stirring mechanism drive and the heating element. In one or more embodiments, the base unit includes a processor and memory storage device. Specific control sequences are stored and may be processed, whereby the stirring and heating mechanisms operate in a specific sequence and manner. In one embodiment, control information, such as cooking control instructions associated with a particular recipe of food to be prepared, may be downloaded from a remote location to the base unit via a telecommunication link.

In one or more embodiments, the food preparation container comprises a specially configured pot. The pot has a mixer which is removably located in its interior. The mixer includes a helical central blade and an outwardly extending swiping blade. The mixer includes a spindle for connection to the drive pin of the base unit via a connecting rod.

The pot has a specific multi-layer construction which optimizes heat generation via the induction heating system. The pot may be removed from the base unit and used independently thereof.

In use, a user places food ingredients into the pot. The user may manually control the heating and stirring mechanism of the appliance using the controls, or initiate a pre-programmed cooking sequence, such as from a memory device associated with the appliance or downloaded from a remote location. During cooking, heat may be added to the food ingredients using the heating mechanism. The food ingredients may be stirred with the mixer. In an embodiment where the mixer includes a helical blade, the direction of rotation may be changed to cause the mixer to move ingredients up and/or down through the pot.

The pot may be removed from the base unit for serving purposes. Other pots or pans may be placed upon the base unit and the base unit may be utilized as a hot plate.

For clean-up, the mixer may be separated from the pot. The base unit may be wiped clean.

The invention provides a multi-function food preparation appliance which is compact. The appliance is also energy efficient.

Further objects, features, and advantages of the present invention over the prior art will become apparent from the detailed description of the drawings which follows, when considered with the attached figures.

DESCRIPTION OF THE DRAWINGS

FIG. 2 is an exploded view of a pot and a portion of a drive assembly of the appliance illustrated in FIG. 1;

FIG. 3 is a perspective view of a pot of the appliance illustrated in FIG. 1, as viewed towards a bottom surface of the pot;

FIG. 7 is an enlarged cross-sectional view of a stirring mechanism of the appliance illustrated in FIG. 1.

DETAILED DESCRIPTION OF THE INVENTION

The present invention is a food preparation appliance. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
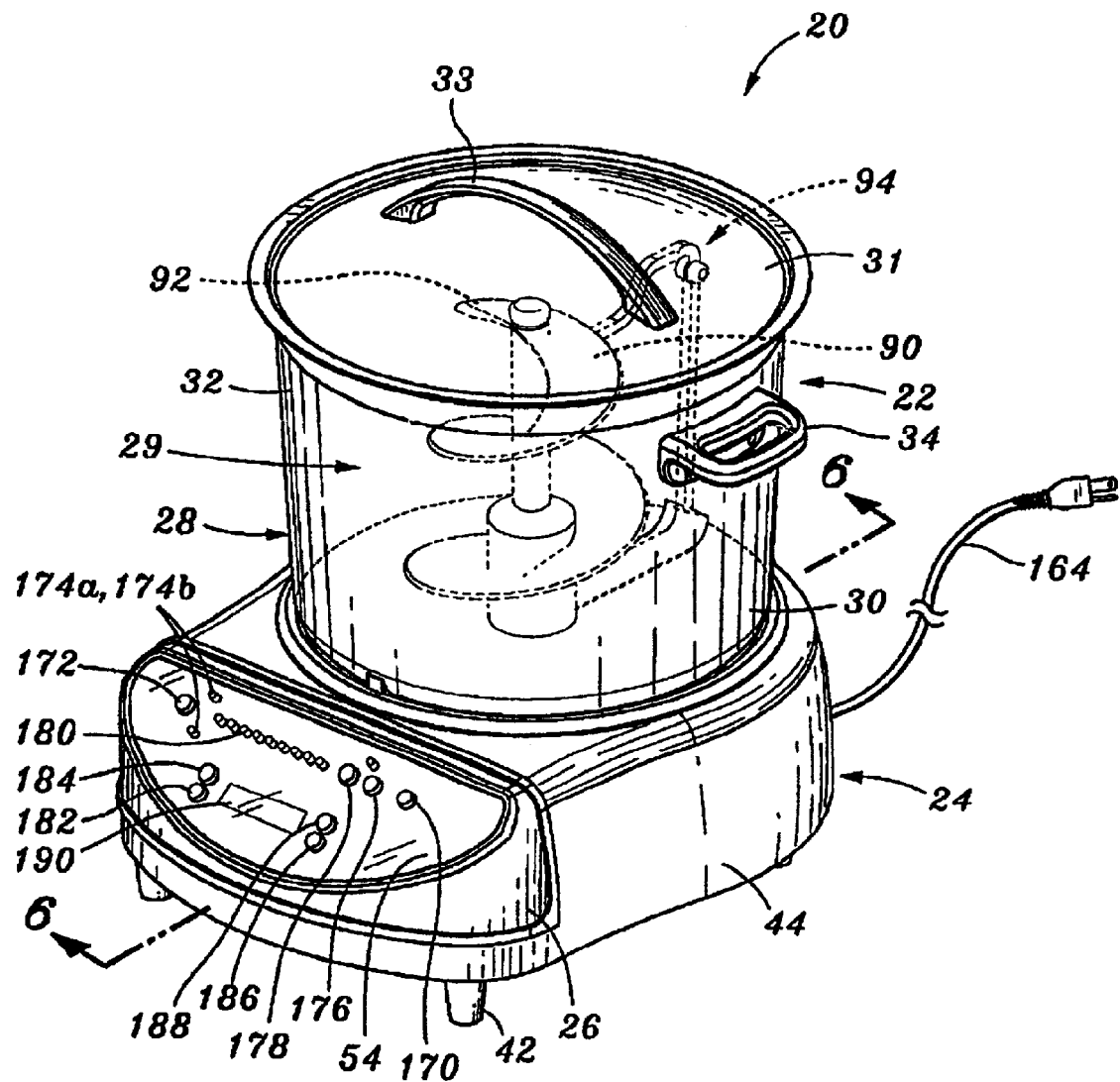
FIG. 1 is a perspective view of an appliance in accordance with the present invention.

The invention will first be described generally with reference to FIG. 1. A food preparation appliance or apparatus 20 is illustrated. The appliance 20 generally comprises a food preparation container 22 and a base unit 24. The base unit 24 has a control panel 26 for use in controlling the appliance 20. A stirring mechanism 29 is associated with the food preparation container 22 for stirring food ingredients therein.

The food preparation container 22 will now be described in more detail with reference first to FIGS. 2 and 3. As illustrated therein, the food preparation container 22 preferably comprises a pot 28. The pot 28 has a bottom or base 30 and a wall 32 which extends upwardly from the base 30 about its circumference. In this configuration, the pot 28 has a generally open top, with the wall 32 and bottom 30 defining an area for containing material. In accordance with the invention as described in more detail below, this material may comprise food and/or food ingredients. Preferably, a pair of handles 34 (only one of which is illustrated, the other being on the opposite side of the pot) are associated with the pot 28. The handles 34 are connected to the wall 32 and extend outwardly therefrom and provide points at which a user may pick up the pot 28 without grasping the pot itself. Such handles are well known and may be constructed in a variety of configurations from a variety of materials, and are desirably arranged to protect the user from the high temperatures associated with the pot 28.

In a preferred embodiment of the invention, the pot 28 has a specialized construction for use in an induction heating arrangement, as described in greater detail below. Preferably, the entire pot 28, comprising both the side wall 32 and bottom 30 are constructed of a multi-layer construction as follows. The interior surface comprises stainless steel, and preferably that variety known as 304 stainless steel. A next layer comprises pure aluminum, a next layer an aluminum alloy, a next layer pure aluminum, and a final layer comprising the external surface of the pot 28 a layer of stainless steel again. Preferably, the layers of pure aluminum comprises 1045 series aluminum alloy comprising essentially pure aluminum. Preferably, the layer of aluminum alloy comprises 3003 series aluminum alloy. Series 3003 aluminum alloy is well known, and comprises aluminum including 1.2% manganese.

The pot 28 may have a variety of constructions using one or more materials other than those described above and constructed in a manner other than that described above. The preferred embodiment construction described has a number of benefits, however. First, the outer layers of stainless steel are extremely durable and act as insulating layers, trapping heat generated by the internal aluminum layers during induction heating. This effect not only makes the pot 28 more energy efficient, but it creates a more stable temperature gradient for preventing burning of food items and even cooking. Further, the construction of the pot 28 is particularly suited to heating by an induction effect heating system, as described in more detail below.

In one or more embodiments, a lid 31 is provided for covering the pot 28. In one embodiment, the lid 31 includes a handle 33 for moving the lid.

The pot 28 is specially configured to be utilized with the base unit 24. First, the pot 28 is arranged to be heated by an induction heating mechanism, described below, of the base unit 24. In addition, the stirring mechanism 29 includes a stirrer which may be located in the pot 28 and moved by a drive mechanism portion of the stirring mechanism 29 which associated with the base unit 24.

The base unit 24 will now be described in greater detail with reference to FIG. 4. The base unit 24 includes a support 40 for supporting the various components of the base unit 24. As illustrated, the support 40 comprises a plate-type element which is generally planar except for an upwardly extending wall at the rear portion thereof.

As illustrated, a plurality of feet 42 extend downwardly from a bottom surface of the support 40. A bottom surface of the support 40 is spaced upwardly from a support surface, such as a counter upon which the base unit 24 is placed, by the feet 42 As illustrated, four feet 42 are provided for this purpose. The feet 42 preferably comprise durable, but smooth material (so as not to scratch a support surface) such as plastic or rubber. Of course, a variety of configurations of feet 24 or other structures may be provided for to support the base unit 24.

A housing 44 is arranged to be connected to the support 40 and cooperate therewith to define a generally enclosed area in which components of the base unit 24 are located. As illustrated, the housing 44 generally comprises an upwardly extending wall which terminates to define a generally circular opening 46 at a top thereof, and which defines a control panel opening 48 at a front thereof. The housing 44 may have a variety of shapes, and is preferably arranged to be aesthetically pleasing to the eye. In one or more embodiments, the housing 44 is constructed from molded plastic or a similar durable and lightweight material. As illustrated, one or more ribs 50 may be provided for adding rigidity and strength to the housing 44.

The base unit 24 includes the control panel 26. The control panel 26 is adapted to be located in the control panel opening 48 defined by the housing 44. The control panel 26 includes a generally planar control surface 54. Preferably, this surface 54 is oriented at an angle, such as 45 degrees from horizontal, so that the controls of the base unit 24 are oriented towards and readily visible and operable by a user of the appliance 20. The control panel 26 defines a number of openings therein through which control mechanisms pass, as described in detail below.

A heating element 56 is located at the top opening 46 defined by the housing 44. As illustrated, the heating element 56 comprises a generally circular heating coil 58 connected to a supporting base 60. The supporting base 60 is generally planar and includes a pair of outwardly extending wings 62,64. In one embodiment, the heating element 56 is supported by a bracket 66. As illustrated, the bracket 66 is connected to and supported by the support 40. The bracket 66 includes a pair of mounting ears 68. The ears 68 are positioned above the support 40, just below the inside surface of the housing 44 with its top adjacent to the opening 46. The wings 62,64 of the supporting base 60 of the heating element 56 are arranged to connect to respective ears 68 of the bracket 66. In this arrangement, the heating coil 58 is inset slightly (i.e. not flush with or in the same plane as) from the top of the housing 44 at the opening 46. The wings 62,64 may be connected to the ears 68 in a wide variety of manners, including rivets, screws, bolts and other fastening elements. A bridge bracket 67 is arranged to extend across the space between the ears 68.

The heating coil 58 includes a generally planar top surface 70. In a preferred embodiment, the heating coil 58 comprises an induction heating coil. Such coils are known, and are arranged to generate heat in an associated object by generating a moving magnetic field.

Preferably, a ring 72 is positioned around the generally circular heating coil 58. In one or more embodiments, the ring 72 is arranged to be selectively removable from the housing 44 with a plurality of pins 74 extending therefrom for engaging mating bores or openings 76 in the top of the housing 44 about the central opening 46. The ring 72 may comprise a number of materials, such as chrome-plated iron. Preferably, the ring 72 has an ornate appeal, and will withstand substantial heat.

The ring 72 defines an inwardly extending flange 78. A generally planar disk 82 is supported by and positioned within the ring 72. In a preferred embodiment, the disk 82 comprises a ceramic plate. The disk 82 may be constructed of a number of other materials, but is preferably constructed of a material which does not heat when subject to an induction electric heating element. This disk 82 has a central opening 84 therein for passage there through of a drive element associated with the stirring mechanism 28, as described in detail below. The disk 82 defines a generally planar, durable surface on which the pot 28 or other food container may be placed.

The base unit 24 includes appropriate circuitry and components for operating the heating coil 58. As described above, the heating coil 58 is preferably a part of an induction heating system. This system is powered by electricity.

As described below, power is selectively provided through one or more wires 88 to the heating coil 56. When power is applied to the coil 56, a moving field is generated. When a metallic item such as the pot 28 is placed within the field, the material of the pot 28 is subject to the field and generates heat.

As described in more detail below, a number of controls are provided for controlling the heating system, such include switches for turning on and off the power and circuitry for controlling the flow of power to maintain desired cooking temperatures. As also described below, the heating system elements may appropriately be located in the base unit 24, and connected to the support 40.

Figure 5:
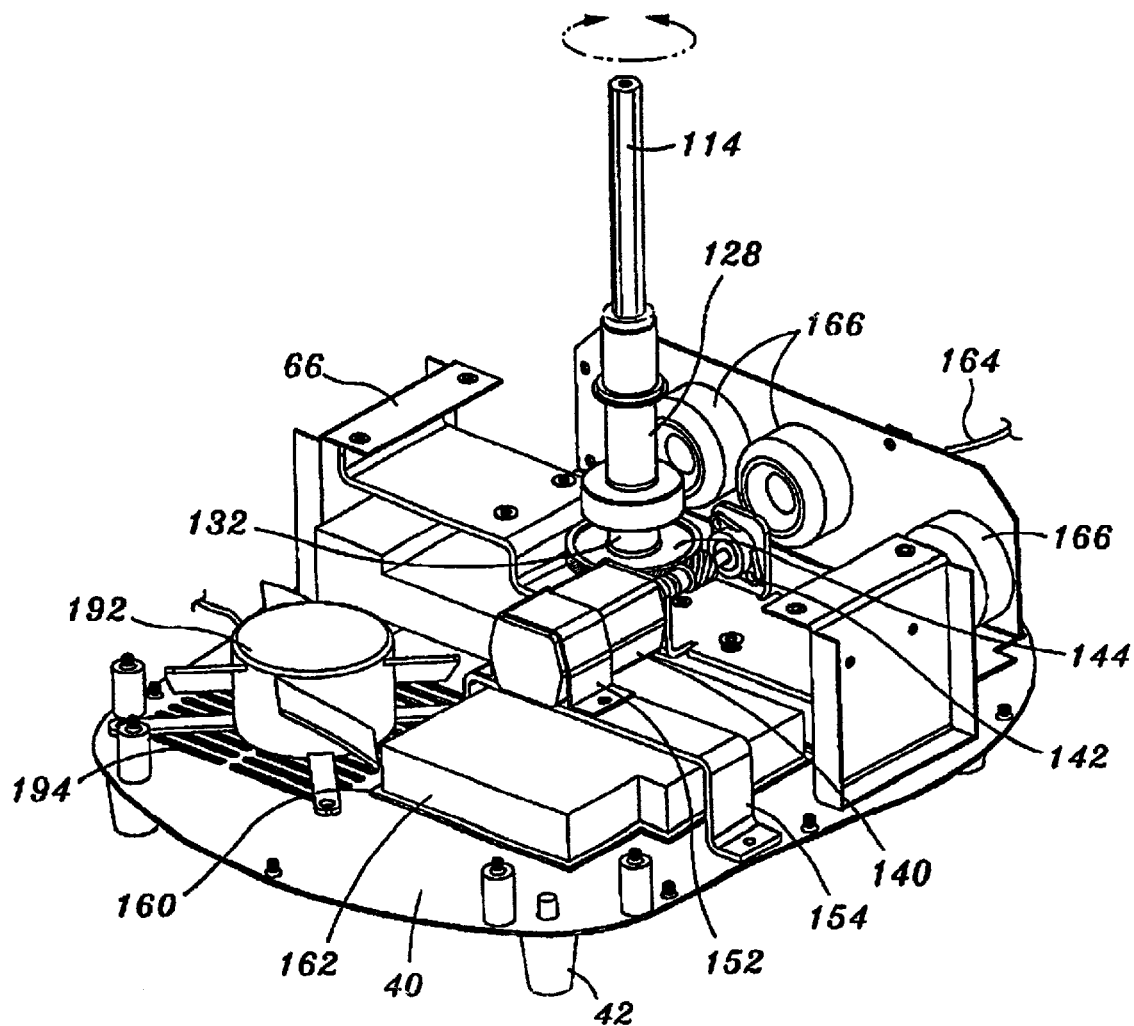
FIG. 5 is an enlarged perspective view of a portion of the base unit illustrated in FIG. 4 with a housing thereof removed.

The appliance 20 includes a stirring mechanism 29 for use in stirring food and food ingredients which are located in the pot 28 when the pot is associated with the base unit 24. Referring to FIG. 1, in one or more embodiments, the stirring mechanism 29 comprises a mixer 90 located in the pot 28 and, as illustrated in FIG. 5, a stirring or mixer drive mechanism for use in moving the mixer 90. In a preferred embodiment, the mixer 90 comprises a central auger 92 and a stirring/wiping blade 94. In general, the auger 92 is arranged to move food and ingredients up and down through the pot 28. The stirring/wiping blade 94 is generally arranged to move food and ingredients around the pot 28, and to remove material adhering to the side wall and bottom of the pot 28.

The mixer 90 will now be described in more detail with reference to FIGS. 2 and 6. The auger 92 has a main body 95 having a first or top end 96 and a second or bottom end 98. The bottom end 98 of the auger body 95 is adapted to receive a drive shaft, as described in detail below.

The auger 92 includes a helical blade 100 which extends from the body 95. As illustrated, the helical blade 100 preferably wraps around the body 95, extending outwardly therefrom a distance which increases when moving in the direction of the top end 96 towards the bottom end 98 of the body 95. The helical blade 100 is preferably shaped such that when rotated in a first direction, it moves material from the top towards the bottom of the pot 28, and when rotated in an opposing second direction, it moves material from the bottom towards the top of the pot 28. The auger 92 may be constructed from a variety of materials, although an inert metal is preferred since such is durable, will not contaminate food, and will withstand high temperatures. The auger 92 may be molded, cast or manufactured in any of a number of manners now or later known.

The stirring/wiping blade 94 comprises a frame 102 and a blade 104. The frame 102 preferably comprises a bracket which extends from the auger 92 for supporting the blade 104 near the side wall 32 of the pot 28 and the bottom surface 30 of the pot 28. As illustrated, the bracket extends generally radially outwardly from the auger 92 near its top end 96, then generally along the side wall 32 of the pot 28, and then generally along the bottom surface 30 of the pot 28 back to the auger 92. In this configuration, the bracket is generally "U"-shaped. The frame 102 is preferably constructed of an inert metal and may be formed unitarily with the auger 92 or separately therefrom.

The blade 104 is selectively attachable to the frame 102. As illustrated, the blade 104 is generally "L"-shaped, having a first generally horizontal section for engaging the bottom surface 30 of the pot 28, and a generally vertical section for engaging the side wall 32 of the pot 28. In a preferred embodiment, a bottom horizontal portion of the frame 102 has a slot therein for accepting the horizontal section of the blade 104. A screw 106 or other means for attachment are provided for retaining the top end of the vertical section of the blade 104 to the frame. Those of skill in the art will appreciate that there are a variety of means by which the blade 104 may be selectively attached to the frame 102. Preferably, the means permit the blade 104 to be removed by the user of the appliance 20 and replaced with another blade. The frame 102 may have any of a variety of configurations and constructions.

The blades 104 may be constructed of a wide variety of materials. In one or more embodiments, the blades 104 are constructed of a polymer such as ABS or other durable and heat tolerant material. Preferably, while durable, the blade 104 is constructed of a material which does not cause damage to the pot 28.

Means are provided for effecting movement of the auger 92 and stirring/wiping blade 94. Referring now to FIGS. 5 and 6 there is illustrated a preferred embodiment of a drive arrangement for the mixer 90. As illustrated, a flange 110 extends upwardly from the bottom surface 30 of the pot 28. The flange 110 defines a generally circular opening 112 which extends from the inside to the outside of the pot 28. Preferably, the flange 110 is threaded on an outer surface thereof.

Referring to FIG. 7, a generally elongate spindle 114 is adapted for positioning within a hollow area of the body 95 of the auger 92. As illustrated, the spindle 114 has a top end for positioning near the top end 96 of the auger 92 within its hollow area. A retainer 116, first washer 118, spacer 120 and second washer 122 are adapted for association with the spindle 114. As illustrated in FIGS. 2 and 7, the retainer 116 generally comprises a sleeve type element having an opening there through from a first end to a second end thereof.

With the retainer 116 placed into the body 95 of the auger 92, the spindle 114 may be extended through the retainer 116 into its upper-most position therein as well. A nut 124 is used to securely connect the auger 92 and spindle 114. The nut 124 has a head and a threaded shaft extending downwardly therefrom. As illustrated, the nut 124 is positioned at the top end 96 of the auger 92 with the threaded shaft passing through a bore therein into the top end of the spindle 114. As illustrated, an outwardly extending flange 126 of the spindle 114 may contact the retainer 116 to prevent upward movement of the spindle 114. It will also be appreciated that in this arrangement, the auger 92 is arranged for selective attachment to the pot 28 via its connection to the spindle 114. When the nut 124 is removed, the auger 92 may be lifted upwardly with respect to the spindle 114 and be removed therefrom for replacement, cleaning and the like.

The first washer 118 is positioned between the flange 126 of the spindle 114 and the spacer 120. The second washer 122 is placed over the spindle 114 adjacent to the spacer 120.

The second end of the spindle 114 has a reduced dimension for accepting a connecting rod 128. Moreover, the second end of the spindle 114 is preferably not circular in shape, but is square or of another shape providing drive contacting surfaces. As illustrated, the connecting rod 128 generally has the shape of a shaft, but includes a recess 130 in the first end thereof. The recess 130 is shaped to accept the second end of the spindle 114. In the case where the second end of the spindle 114 is generally square in outer shape, the recess 130 is as well. In this arrangement, when the spindle 114 is engaged with the connecting rod 128, both elements will rotate with one another.

The connecting rod 128 is sufficiently long that it extends from the spindle 114 beyond the bottom surface 30 of the pot 28 when engaged therewith. The connecting rod 128 is arranged to extend through a guide/bushing of the bridge bracket 67 (see FIG. 4). The connecting rod 128 is adapted to be driven by the drive mechanism associated with the base unit 24. As described in more detail below, a drive pin 132 is located in the housing 44 and is arranged to be rotated. The drive pin 132 has a recess 134 located in a top surface thereof. The recess 134 is adapted to receive a driven portion 136 of the connecting rod 128. In like arrangement to the spindle 114, the driven portion 136 of the connecting rod 128 is square or is otherwise provided with driving surfaces. The recess 134 in the drive pin 132 is similarly shaped for accepting the connecting rod 128.

In addition, it will now be appreciated that the pot 28, including the auger 92, may be removed from the base unit 24. The pot 28 may be lifted from the base unit 24 by disengaging either the spindle 114 from the connecting rod 128, or the connecting rod 128 from the drive pin 132. Moreover, when coupled, the bottom surface 30 of the pot 28 rests flush upon the heating disk 82.

Means are provided for driving the drive pin 132 in rotating fashion. As illustrated in FIG. 5, a motor 140 is provided. The motor 140 is preferably electrically powered and includes an output shaft having a drive gear 142 positioned thereon. The drive gear 142 is positioned and configured to drive a driven gear 144 to which the drive pin 132 is mounted. Preferably, the drive and driven gears 142,144 form a worm gear pair, each arranged to rotate about an axis perpendicular to the other.

A wide variety of other drive arrangements are contemplated. For example, the motor need not drive the drive pin 132 in a direct gear to gear fashion. Instead, a belt drive may be provided. The motor may also be mounted vertically and be provided with the drive pin 132 directly coupled to its output shaft.

Referring now to FIG. 7, when the driven gear 144 is rotated, the drive pin 132 rotates. The drive pin 132 then effects rotation of the connecting rod 128 and the spindle 114 attached thereto. The spindle 114 causes the auger body 95 to rotate, thus effecting a mixing of material within the pot 28.

Preferably, appropriate support elements are provided for the drive mechanism. As illustrated, a first bearing 146 is associated with the top end of the drive pin 132 near its connection with the connecting rod 128. The first bearing 146 is arranged to rotatably support the top end of the drive pin 132 with respect to an associated bracket 150 of the housing 44. This bracket 150 is preferably arranged to extend between the ears 68 of the mounting bracket 66, described in detail above. A second bearing 148 is associated with the bottom end of the drive pin 132 below the driven gear 144.

As best illustrated in FIG. 5, a retention bracket 152 is arranged to engage the motor 140 and a support bracket 154 which extends from the support plate 40. In this manner, the motor 140 is securely mounted to the support plate 40 and is maintained with the drive gear 142 in proper alignment with the driven gear 144.

Preferably, means are provided for controlling the various elements of the appliance 20, including the heating and stirring mechanisms. In one or more embodiments, this means comprises a controller. In one embodiment, the controller includes a printed circuit board 160, as illustrated in FIG. 5. Power is provided to the various electrically powered elements of the appliance 20 via the printed circuit board 160. Preferably, power is provided to the appliance 20 via a power cable 164. The power cable 164 is, in one or more embodiments, adapted to plug into a standard socket and receive 120 V power at 60 Hz alternating current. One or more transformers 166 may be provided for converting the incoming current to a direct current and stepping down the voltage to a lower voltage, such as 12V.

Referring to FIG. 1 again, a power switch 170 is preferably provided for selectively turning on and off the power of the supplied appliance 20 through the power cable 164. A heat button 172 is provided for activating and de-activating the heating element 56. This button 172 preferably allows a user to select a "heating" or a "warming" mode, as indicated by associated LED lights 174a,b or similar indicators. In one embodiment, the difference between the heating and warming modes comprises a range of power levels which may be applied by the heating element 56, with the warming mode comprising a mode in which less heat is generated by the heating element 56 than in the heating mode. In one embodiment, a temperature up 176 and temperature down 178 button are provided for selecting a particular temperature or level of heating applied in the warming or heating mode. Preferably, a display 180 is provided for indicating the temperature level utilized in the warming or heating mode. As illustrated, the display 180 comprises a plurality of LED lights arranged sequentially. The LED's may be arranged to illuminate in sequence from left to right as the selected temperature increases.

Controls are provided for controlling the stirring mechanism. As illustrated, a start/duration button 182 is provided for activating the stirring mechanism. In the present invention, such activation comprises powering the motor 140 which drives the mixer 90. A speed selection button 184 is provided for selecting the speed of the stirring mechanism. The speed selection button 184 is arranged to control the speed of rotation of the motor 140, and thus the speed of rotation of the mixer 90. A direction button 188 is provided for controlling the direction in which the stirring mechanism rotates. In one embodiment, the direction button 188 has two positions, one corresponding to a counter-clockwise direction and one corresponding to a clockwise direction. A clock button 186 is provided for controlling a clock, including time to cook and stir functions.

Information may be displayed to the user by a display 190. In one or more embodiments, the display 190 comprises an LCD type display. The display 190 may be capable of displaying a wide variety of information such as the direction and speed of stirring, the time remaining to cook and/or store, the time and date, and service and diagnostic information in the event the appliance 20 breaks down or requires servicing.

Figure 4:
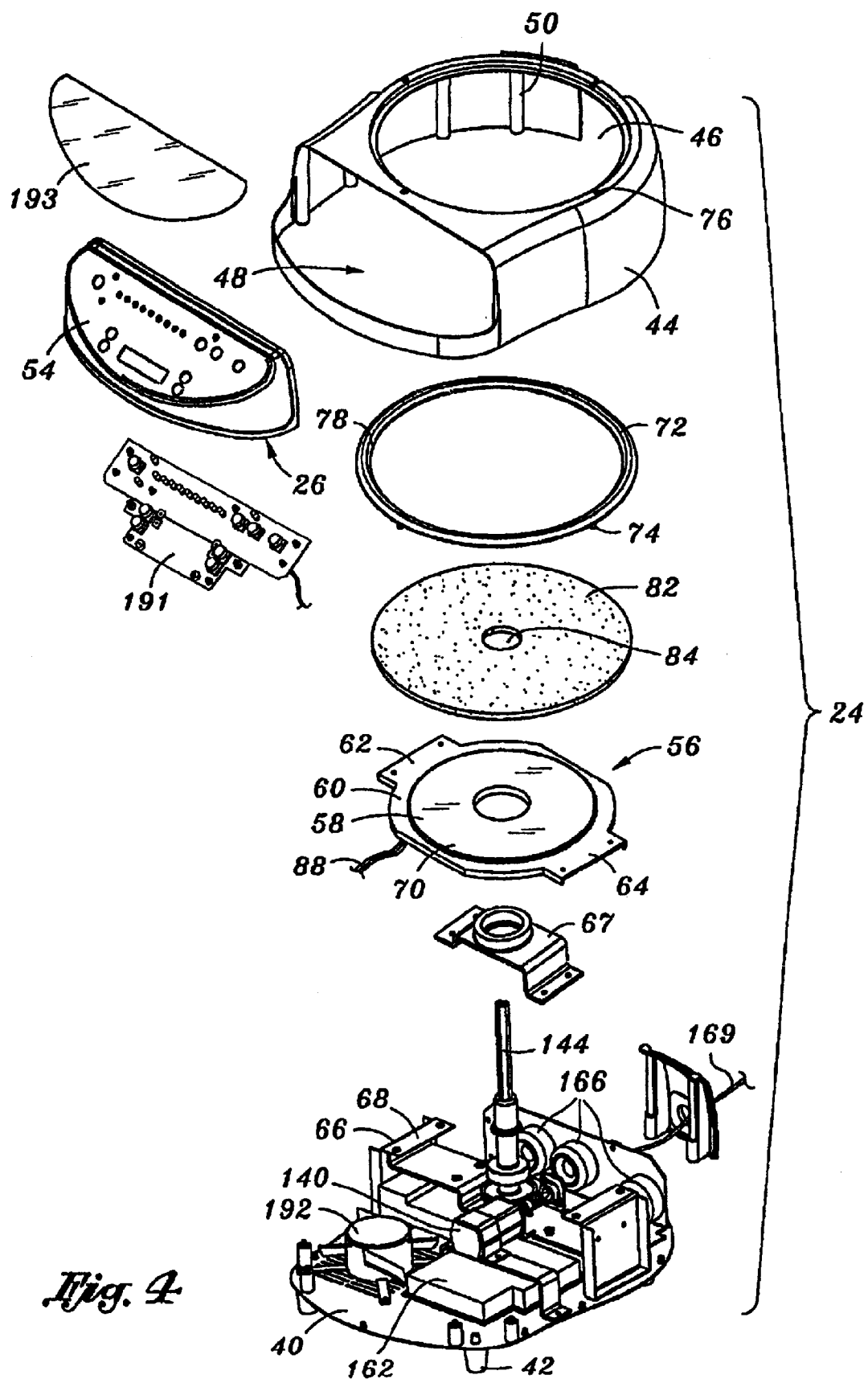
FIG. 4 is an exploded view of a base unit of the appliance illustrated in FIG. 1.

As illustrated in FIG. 4, these various controls and displays are preferably associated with a support 191. In the embodiment illustrated, the support 191 is arranged to be positioned behind the control panel 26, with the various LEDs, buttons and the like extending through or visible through openings in the control panel 26. In one embodiment, a cover 193 is positioned over the control panel 26. This cover 193 is preferably constructed of a clear, flexible material. The cover 193 is arranged to protect the controls from damage, such as exposure to moisture and particulate matter, but yet permit a user to view information which is displayed and to activate the buttons/controls.

Referring to FIG. 5, an electric fan 192 is provided inside of the base unit 24. As illustrated, the fan 192 is located adjacent the circuit board 160 and motor 140 for keeping these elements cool. A number of vents 194 are provided in the base plate 40 through which air may circulate, bringing cooler air from the outside of the base unit 24 into the interior of the unit. In one embodiment, the fan 192 is arranged to activate upon the interior of the base unit 24 reaching a predetermined temperature, such as detected by a thermostat (not shown).

The appliance 20 may be pre-programmed to perform certain cooking functions. Such cooking function information may be stored on a read only memory (ROM) device or other information storage device associated with a processing unit. In one or more embodiments, the ROM and processor may be integrated onto the printed circuit board 160. For example, the appliance 20 may include a number of pre-programmed cooking sequences including a variety of heating and stirring parameters. A user may also program a custom cooking sequence using the controls and store the cooking information for later use.

A variety of other features and configurations of the appliance are contemplated. For example, in one or more embodiments, the appliance 20 includes a card reader or other removable media reading device, such as a CD-Rom, smart card reader, chip (ROM/RAM) reader, or tape drive. The appliance 20 may include a bar-code or similar optical reader for reading coded or un-coded information. In such event, a user of the appliance 20 may load information to the appliance 20 utilizing the information reading device. For example, in one embodiment, a recipe card having encoded information may be provided with a product sold at a store, allowing the purchaser to use the card to program the appliance 20 to cook a particular food. In another embodiment, this information may be provided on a bar code printed on a label of the product purchased.

In one embodiment, the appliance 20 includes a modem or other communications interface for permitting the appliance 20 to receive information from a remote source. In such event, the appliance 20 includes at least one data storage element, such an EPROM, flash ROM or other memory device for storing the information which is received. The modem may be arranged to receive information from a wireless or hard-wired network from a remote location, such as a remote server. As is well known, the network may comprise a variety of hardware and software, including wireless and wired communications lines. In one embodiment, a remote server is associated with the Internet. Information is downloaded from the remote server over the Internet through the communications interface of the appliance 20. This information may comprise control information, such as a heating/cooking control sequence.

In this embodiment, a user of the appliance 20 may browse a particular website which provide cooking instructions and details. Upon finding one or more recipes that the user is interested in, the user may request the downloading of control instructions for the appliance 20. Once downloaded, the user may provide the appropriate ingredients to the appliance 20 and select the cooking control instructions for that recipe. It will be appreciated that a variety of hardware and software may be used, in a variety of configurations, to provide the appliance 20 with these features.

In a preferred embodiment, a means for sensing a cooking temperature is provided. In one embodiment, this means comprises at least one sensor for sensing a temperature in the pot 28 or the material being cooked in the pot. The sensor may comprise a thermometer or other device. In a preferred embodiment, however, the means for sensing comprises a thermistor (i.e. resistive thermometer such as that known as an NTC resistor). In one embodiment, the thermistor (not shown) is associated with the drive pin 132. In this arrangement, the temperature within the pot 28 is detected by the corresponding temperature of the drive mechanism 29, i.e. a path leading through the auger 92, spindle 114 and connecting rod 128. This arrangement has the advantage that the thermistor is conveniently mounted within the base unit 24, which both protects the thermistor and eliminates the need for complex connections or other arrangements in an arrangement where the sensing device is associated directly with the pot 28 (which as stated above, is desirably arranged to be removed and replaced).

In one embodiment, the means for sensing, such as the thermistor, is arranged to detect a boiling condition in the pot 28. In such event, the thermistor is arranged to cause the controller (in one embodiment, the thermistor may provided a signal to the circuit board 160) to reduce or turn off the heating mechanism. In this manner, a boil-over condition can be averted. In addition, in some recipes, it is desirable to bring a material to a boil and then allow it to simmer for a period of time. In one embodiment, the thermistor can be used to detect the boiling condition, with the controller then arranged to reduce the applied heat to maintain a simmer condition.

A method of using the appliance 20 will now be described with reference primarily to FIG. 7. First, the pot 28 is assembled as illustrated to include the stirring mechanism 29. As noted above, the mixer 90 of the appliance may be separated from the pot 28 for ease of cleaning and the like. Once assembled, the user may place food ingredients or other materials to be processed within the pot 28.

The pot 28 may then be placed onto the disk 82 with the mixer 90 placed into driving engagement with the drive mechanism. In a preferred arrangement, the connecting rod 128 is not connected to the pot 28 except when the pot 28 is placed on the base unit 24. In this manner, the bottom of the pot 28 is flat, permitting the pot 28 to rest on a counter or other support surface.

When the stirring mechanism 29 is to be used, the connecting rod 128 is placed into engagement with the drive pin 132 in the base unit 24. In addition, the spindle 114 of the mixer 90 is placed into engagement with the drive pin 132 when the pot 28 is placed on the base unit 24, as illustrated in FIGS. 6 and 7. In this position, the bottom of the pot 28 rests upon the disc 28 and the mixer 90 is engaged by the drive mechanism, whereby the auger 92 and blade 104 may be rotated within the pot 28. While the pot 28 is placed on the base unit 24, the user may, of course, add ingredients and materials to the pot 28 at any time.

With the pot 28 engaging the base unit 24, the user may turn the power on to the unit by engaging the power switch 170. The user may then select a particular cooking program, as described above. Such a program may be selected from a menu. The menu may be presented on the display 190. In one embodiment, the user may uses one or more of the controls, such as the temperature up and down controls 176,178 as menu selectors when in a menu mode. For example, the user may select a "manual" mode from the menu, enabling the user to control the appliance 20 entirely manually through the controls. The user may select a "custom program" mode from the menu, enabling the user to program a specific program for then or a later time. The user may also select a "specific program" mode in which the user may select from and activate a program which is stored or downloaded to the appliance 20.

In one or more modes, such as a "manual" mode, the user may manually initiate heating and stirring functions. The user may initiate a heating function by activating the heat/warm selector 172. The user may select a particular heating temperature with the temperature up and down selectors 176,178. In one embodiment, the user may program a heating sequence which includes heating at various temperature for various periods of time.

The user may select a particular stirring or mixing function by activating the stirring mechanism start selector 182. A duration of the stirring may also be selected with this selector 182. The speed of the stirring and the direction of stirring may be selected with the speed selector 184 and direction selector 188.

When a heating function is selected, power is directed to the coil 58. As stated above, via an electrical induction effect, heating of the pot 28 occurs. The heat generated in the body of the pot 28 is transferred to the food ingredients and other materials therein, heating these materials.

When the stirring function is selected, power is provided to the motor 140 in a manner causing the motor 140 to rotate at a particular speed and in a particular direction. Referring to FIG. 5, when the motor 140 rotates, so does the drive gear 142 and thus the driven gear 144. The driven gear 144 rotates the drive pin 132, the connecting rod 128 connected to the drive pin, the spindle 114, and the auger 92 connected to the spindle 114. In addition, rotation of the auger 92 effects rotation of the wiper blade 92.

Figure 6:
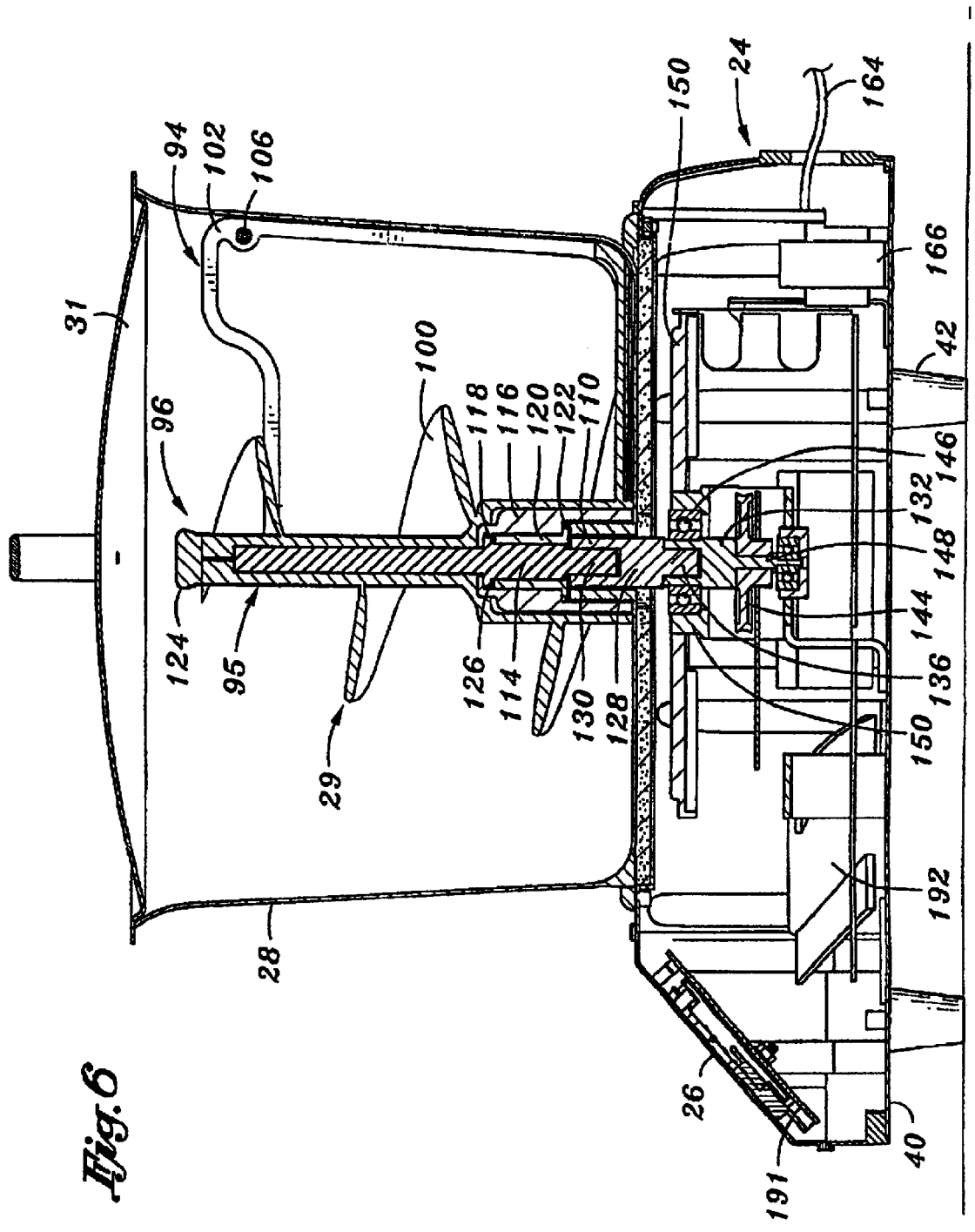
FIG. 6 is a cross-sectional side view of the appliance taken along line 6—6 illustrated in FIG. 1.

As will be appreciated when considering FIGS. 6 and 7, when the helical blade 100 rotates in a counter-clockwise direction, food and ingredients are generally forced downwardly towards the bottom of the pot 28. On the other hand, when the helical blade 100 rotates in a clockwise direction, food and ingredients are moved towards the top of the pot.

During mixing, the swiping blade 104 moves around the pot 28 in the selected direction of rotation. Regardless of the direction of rotation, the swiping blade 104 serves to mix the material in the pot 28 by rotation (and not by vertical movement, as in the case of the auger). In addition, the stirring/wiping blade 94 lightly contacts the bottom and inside wall of the pot 28, preventing food material from sticking to the inside of the pot 28.

Once the food has been cooked as desired, the pot 28 may be lifted from the base unit 24 and set upon a table or other surface and used as a serving dish.

An additional feature of the appliance 20 is that the base unit 24 may be used as a hob or hot plate. In this regard, any metal pan or pot may be placed on the disk 82 and heated with the heating element of the appliance 20. As illustrated, the appliance 20 is particularly arranged to accomplish this purpose. The stirring mechanism 29 is arranged so that it does not interfere with the use of the appliance 20 as a hot plate. As illustrated in FIG. 6, when the connecting rod 128 is removed, the disk 82 presents a flat surface for use as a hot plate. In one embodiment, a blanking plug (not shown) or similar item may be inserted in place of the connecting rod 128 and render the disk 82 a generally contiguous closed surface.

Clean up of the appliance 20 is extremely easy. The mixer 90 may be removed from the pot 28 for cleaning of these components. The top surface of the disk 82 and the outside of the base unit 24 may be wiped clean.

A variety of variations of the assembly, configuration and use of the appliance 20 are contemplated. The pot 28 and its construction may vary from that described above. For example, a variety of metal pots or pans may be used in conjunction with the heating element of the appliance 20. In such event, however, the advantages of the particular pot construction of the invention may not be realized. The pots or pans used with the appliance 20 may vary in size.

In one or more embodiment, the appliance 20 may include a different type of heating element but still include one or more of the other features of the invention. For example, the heating element may comprise an electrically powered resistive element, gas flame or the like.

In another embodiment, the induction heating element may be used in conjunction with a different type of stirring mechanism. The stirring mechanism may be powered in a wide variety of ways. The mixer 90 portion of the stirring mechanism may include other than an auger element and a wiping blade. In one embodiment, more than one wiping blade may be utilized. For example, a plurality of blades may extend outwardly at different radial and vertical positions.

The appliance 20 of the invention has numerous features and advantages. First, the appliance 20 is extremely versatile, performing many different and beneficial functions including heating and stirring. Moreover, the appliance 20 is compact, not taking up significant space. A user may conveniently place the appliance 20 on a counter or in a similar location. In one embodiment, the base unit 24 of the appliance 20 is only slight larger (in footprint) than the pot itself. As will be appreciated, the size of the appliance 20 is much less than a stove or a larger mixer, and yet performs the functions of both, along with those of other elements such as heating pads.

As stated above, the heating mechanism of the appliance 20 is extremely efficient, especially when used with the pot 28 having the construction described above. Induction heating requires less energy to heat, and is efficient in heating the food and other materials in the pot in a much more even manner. As is known, when cooking it is desirable to cook the ingredients evenly and not permit ingredients which are located at the bottom of the cooking pot or pan to burn or scorch.

The heating arrangement of the present invention is also advantageous in that the disk 82 does not become heated. Thus, other elements may be placed on the disk 82, such as plastic bowls, without being heated and damaged. Also, because the disk 82 is not heated and does not become hot, a person will not be burned by touching it, protecting the user, children and the like.

The stirring mechanism of the invention is also very efficient. As described above, the auger 92 is useful in moving material up and down through the pot 28. At the same time, the stirring/wiping blade 92 rotates the material and prevents material from sticking to the wall and bottom of the pot 28. In this manner, food ingredients are constantly stirred, integrating them quickly and aiding in maintaining the ingredients at a uniform temperature.

The appliance 20 is easy to clean and use. The mixer 90 may be removed from the pot 28, facilitating cleaning. The pot 28 may be selectively coupled or decoupled to the drive mechanism of the stirrer, whereby the pot 28 may be placed on the base unit 24 with or without being connected to the stir drive. In addition, the pot 28 may be used apart from the base unit 24.

In one or more embodiments, a plug (not shown) may be provided for connection to the flange 110 for closing the opening 112 of the pot 28. This permits a user to use the pot 28 without the mixer 90 associated therewith.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A food preparation appliance comprising a base unit and a container in which food to be prepared is placed, said container including a base and at least one upwardly extending wall, said base and at least one wall defining an interior of said container, a helical blade positioned in said interior of said container and a swiping blade positioned radially outward of said helical blade and rotatable with said helical blade, said swiping blade engaging said base and said at least one upwardly extending wall, said helical and swiping blades for moving material placed in the container, said base unit including an inductive heating element, said inductive heating element positioned below a generally planar support on which said container may be placed and said base unit including a rotational drive mechanism, said rotational drive mechanism adapted to rotate said helical blade.

2. The food preparation appliance in accordance with claim 1 wherein said rotational drive mechanism comprises a motor driving a drive element, said drive element having an aperture therein for accepting an end of a spindle, said spindle coupled to said helical blade.

3. The food preparation appliance in accordance with claim 1 wherein said generally planar support has an aperture therein through which a drive element connecting said helical blade and rotational drive mechanism may extend.

4. The food preparation appliance in accordance with claim 1 wherein said base unit includes a controller controlling the operation of said induction heating unit and said rotational drive mechanism.

5. A food preparation appliance comprising:

a pot, said pot having a base and an upwardly extending wall forming a generally circular periphery;

a helical blade located in said pot, said helical blade mounted to a first end of a spindle, a second end of said spindle connected to a first end of a connecting rod, a second end of said connecting rod extending outwardly from said base of said pot;

a swiping blade connected to said helical blade, said swiping blade located radially outward of said helical blade and engaging an inner surface of said wall of said pot;

a base unit, said base unit including a housing supporting a mounting ring, a plate supported by said mounting ring, said plate having an aperture therein through which said connecting rod extends when said pot is placed on a top surface of plate, an inductive heating element positioned adjacent a bottom surface of said plate, a motor in driving relation with a drive member, said drive member including a recessed portion for accepting a mating portion of said second end of said connecting rod, and a control unit, said control unit including one or more controls for accepting input from a user, said control unit operably associated with said motor for controlling said motor and said inductive heating element for controlling the operation of said heating element.

6. The food preparation appliance in accordance with claim 5 wherein said motor has an output shaft with a driving gear thereon and said drive member has a driven gear connected thereto which is driven by said driving gear.

7. The food preparation appliance in accordance with claim 5 wherein said housing defines a control panel and one or more of said controls are located at said control panel.

8. The food preparation appliance in accordance with claim 5 wherein a frame having a top portion and a bottom portion extends from said helical blade, said swiping blade connected to said frame.

9. The food preparation appliance in accordance with claim 5 wherein said bottom portion of said frame includes a slot for accepting a first end of said blade and said top portion of said frame includes an aperture for accepting a fastener connecting a second end of said blade thereto.

10. The food preparation appliance in accordance with claim 5 wherein said helical blade has a top end having a passage there through and including a nut, said nut having a threaded portion for extending through said passage into engagement with said first end of said spindle whereby said helical blade is removably connected to said spindle.

11. The food preparation appliance in accordance with claim 5 wherein said pot has a multi-layer construction of an aluminum containing material located between layers of stainless steel.

12. The food preparation appliance in accordance with claim 11 wherein said pot has an inner stainless steel layer, a next aluminum alloy layer, a next pure aluminum layer, a next aluminum alloy layer, and an outer stainless steel layer.

* * * * *